United States Patent Office 3,244,642
Patented Apr. 5, 1966

3,244,642
PROCESS FOR PRODUCING A CATALYST COMPOSED OF TIN AND ANTIMONY OXIDES
Edward James Gasson, Epsom Downs, and Rowland Harris Jenkins, West Ewell, England, assignors to The Distillers Company Limited, Edinburgh, Scotland, a British company
No Drawing. Filed May 21, 1963, Ser. No. 282,113
Claims priority, application Great Britain, June 12, 1962, 22,425/62
3 Claims. (Cl. 252—430)

The invention relates to processes for making catalytic compositions and in particular to catalytic compositions comprising antimony and tin oxides, suitable for use in catalysing oxidation reactions of organic compounds.

The powdering and crumbling of pelleted catalyst compositions caused by attrition and general handling is well known. It is an object of the present invention to provide a process for making a pelleted catalyst which has increased physical hardness as compared with pelleted catalysts produced hitherto and in addition has an increased selectivity for the desired oxidation reaction.

It has now been found that such catalyst compositions having these improved properties may be obtained by the addition of a minor amount of ethyl silicate.

Accordingly the present invention relates to a process for making a catalytic composition comprising a catalyst selected from the group consisting of antimony tetroxide admixed with stannic oxide and a composition constituted by antimony, tin and oxygen in admixture with a minor amount of ethyl silicate.

The catalyst as formed by such process may be regarded either as a mixture of antimony tetroxide with stannic oxide or as a compound of antimony, tin and oxygen; under the reaction conditions either or both forms may be present. The catalyst may be prepared from any of the oxides of antimony and tin, or from compounds of tin or antimony which on heating in the presence of an oxygen-containing gas, such as air, are converted to the oxides. Oxides of antimony and tin which may be used in the manufacture of the catalyst include antimony trioxide, antimony tetroxide, antimony pentoxide or mixtures of such oxides; stannic oxide, stannous oxide, or mixtures of such oxides. Hydrated forms of these oxides may also be used, for instance such as are formed by the action of aqueous nitric acid on antimony or tin metals or on mixtures of the metals. The catalyst may be prepared for instance by mixing together any of the oxides of antimony and tin, of substances yielding these oxides, and subjecting the mixture to a heat-treatment in the presence of an oxygen-containing gas such as air, for instance at a temperature between 550 and 1100° C. Where the initial components are antimony tetroxide and stannic oxide themselves, it is still preferred to subject the mixture to a prior heat-treatment with or without oxygen for instance at a temperature between 550 and 1100° C.

A particularly preferred method of preparing the antimony oxide/tin oxide catalyst comprises intimately mixing stannic oxide or the hydrated oxide obtained by the action of aqueous nitric acid on tin metal, with antimony pentoxide, antimony tetroxide, or the hydrated oxide formed by the action of aqueous nitric acid on antimony metal, and heat-treating the resulting mixture at 550 to 1100° C. in the presence of an oxygen-containing gas such as air.

Another preferred method of preparing the antimony oxide/tin oxide catalyst comprises hydrolysing with water cationic salts of the metals, such as the chlorides, and recovering and heating the resulting precipitate. To obtain complete hydrolysis it may be necessary to add a volatile base such as ammonia. Either or both of the metal oxide components of the catalyst may be prepared in this way. Particularly useful catalysts can be prepared by this method from stannic chloride and antimony pentachloride by mixing them together in aqueous media and adding ammonia until the pH is greater than 5.0, recovering the precipitate and heating it at a temperature between 550 and 1100° C.

When the tin and antimony compounds in the mixture are present in the lower valency state, i.e. as divalent tin or trivalent antimony compounds, it is particularly preferred to subject the mixture to a preliminary heat-treatment in an atmosphere comprising oxygen and an inert gas such as nitrogen, carbon dioxide or steam, the temperature being controlled so that no part of the catalyst during this preliminary heat-treatment exceeds a temperature of about 650° C.; in this way loss of the lower valent metallic compounds by volatilisation is avoided. A convenient way of doing this it to heat pellets of the composition in a furnace, the temperature of which is raised from about 300° to about 650° C., over a period of not less than about 8 hours, while passing a stream of air over the catalyst. After this preliminary heat-treatment, the mixture is then subjected to a final heat-treament in air at a temperature in the range 550 to 1100° C.

The ethyl silicate may be added in any suitable manner to the catalyst and at any time during or after its preparation. For example ethyl silicate may be added to the pelleted catalyst, the resultant treated pellets being subjected to a heat-treatment in air at a temperature in the range 550° to 1100° C. Alternatively, ethyl silicate may be added to the dried powdered composition before pelleting and heat treatment.

The amount of ethyl silicate added may vary between moderately wide limits. Preferably amounts between 2% and 15% molar are used.

The catalytic material of the present invention may, if desired, be deposited on a support such as silica.

By whichever method the oxides or hydrated oxides have been prepared, the mechanical stability of the finished composition is enhanced by washing, preferably with water before drying.

Reactions in which the catalytic composition of this invention is of particular value include the oxidation of propylene to acrolein, the oxidative dehydrogenation of butene to butadiene in the presence of molecular oxygen, the oxidative dehydrogenation of methylbutene to isoprene in the presence of molecular oxygen, the conversion of propylene to acrylonitrile and of isobutene to methacrylonitrile in the presence of ammonia and molecular oxygen, and the conversion of methanol to hydrogen cyanide also in the presence of ammonia and molecular oxygen. The rate of heating is not critical, but may be such as to produce a temperature rise of 5 to 30° C. per hour. The final temperature of the heat treatment may suitably be maintained for a period of 10 to 32 hours.

The improvements to be achieved by use of the process for making the catalytic composition of the present invention are illustrated further with reference to the following examples in which parts by weight bear the same relationship to parts by volume as do grammes to millilitres.

Example 1

190 parts by weight of powdered tin metal were slowly added to a well stirred solution of 800 parts by volume of nitric acid (S.G.=1.42) dissolved in 3200 parts by weight of water. 48.8 parts by weight of powdered antimony metal was added to 200 parts by volume of nitric acid (S.G.=1.42) with stirring. During the additions, the acids were maintained at their boiling points, and afterwards the acid mixtures were boiled and stirred until no more brown nitrous fumes were evolved. The antimony oxide suspension was then added to the tin mixture and stirred for several minutes. The mixture was filtered, the precipitate washed with distilled water, dried, and the resulting powder mixed with 2% by weight of graphite and pelleted. The catalyst (Sn:Sb=4) was oxidised in a stream of air, the temperature raised from 300°–500° C. at 20° per hour, and 500°–725° C. at 35° per hour. The catalyst was then heated at 725° C. for 16 hours and again at 1,000° C. for 16 hours. A measure of the pellet strength was obtained by a measurement of the average force (in lbs. wt.) the pellets could withstand before being crushed. Pellet strength of catalyst=1.9.

The catalyst was placed in a reactor maintained at 460° C. and a gaseous mixture consisting of 10% by volume of propylene, 50% by volume of air, and 40% by volume of steam was passed over the catalyst, the contact time being 4 seconds.

Of the propylene fed, 41.1% was converted to acrolein and 9.2% to carbon dioxide. The yield of acrolein based on propylene consumed was 66.3%.

Example 2

29.5 parts by volume of the above catalyst prepared as described in Example 1 was treated with a solution prepared as follows. 6 parts by weight of ethyl silicate were dissolved in 5.3 parts by volume of alcohol (pure industrial grade), and the maximum volume of water added before two phases were formed (ca. 1.4 parts by volume). One drop of piperidine was added and the solution poured onto the catalyst pellets which were stirred carefully, to ensure their uniform wetting. The pellets were left at room temperature for 3 days, dried overnight at 110° C. and then heated at 725° C. for 16 hours. The strength of the catalyst pellets, was 6.1 lbs. wt. The catalyst contained 7.6% molar of silica.

The catalyst was placed in a reactor maintained at 466° C. and a gaseous mixture of 10% by volume of propylene, 50% by volume of air and 40% by volume of steam was passed over the catalyst, the contact time being 4 seconds.

Of the propylene fed, 19.4% was converted to acrolein and 1.3% to carbon dioxide. The yield of acrolein based on propylene consumed was 83.0%.

It has been found that an improved catalyst composition prepared according to the above example has a very selective action for the oxidation of propylene to acrolein and finds particular application in fluidised bed operation using the catalyst in a powdered form.

Example 3

A catalyst was prepared in the manner described in Example 2 except that 3 parts by weight of ethyl silicate dissolved in 5.3 parts by volume of alcohol (pure industrial grade) was used. The catalyst contained 3.8% molar of silica. Strength of pellets=3.4 lbs. wt.

The catalyst was maintained in a reactor at 500° C., and a gaseous mixture consisting of 10% by volume of propylene, 50% by volume of air and 40% by volume of steam was passed over the catalyst, the contact time being 4 seconds.

Of the propylene fed, 21.3% was converted to acrolein and 2.0% to carbon dioxide. The yield of acrolein based on propylene consumed was 80.7%.

Example 4

A catalyst was prepared by the addition of tin and antimony metals to nitric acid; the suspensions were mixed, the precipitate washed, dried and pelleted, as described in Example 1.

The catalyst was oxidised, and heat treated treated at 725° C. for 16 hours, and the pellets treated with an alcoholic solution of ethyl silicate (=7.6% molar of silica) as described in Example 2.

After a further heat treatment at 850° C. for 16 hours the pellet strength was 4.2, increasing to 11.5 after an additional heat treatment at 950° C. for 16 hours.

The catalyst was placed in a reactor maintained at 480° C., and a gaseous mixture consisting of 10% by volume of propylene, 50% by volume of air and 40% by volume of steam was passed over the catalyst, the contact time being 4 seconds.

Of the propylene fed, 39.6% was converted to acrolein and 8.4% to carbon dioxide. The yield of acrolein based on propylene consumed was 66.0%

Example 5

A tin/antimony oxide catalyst (Sn:Sb=4) was prepared as described in Example 1, but the unheated powder (53 parts by weight; 30 mesh) was impregnated with an alcoholic solution of ethyl silicate (=7.6% molar of silica). The powder was dried, ground to pass 30 mesh (B.S.S.) mixed with 2% by weight of graphite and pelleted. The pellets were oxidised in a stream of air, the temperature was raised from 300°–725° C. at 21.4° per hour, and then maintained at 725° C. for 16 hours. The pellet strength was then 3.0 lbs. wt. The catalyst after an additional heat treatment at 900° C. for 16 hours had a pellet strength of 4.6 lbs. wt.

A gaseous mixture consisting of 10% by volume of propylene, 50% by volume of air and 40% by volume of steam was passed over the catalyst in a reactor maintained at 470° C. at a contact time of 4 seconds.

Of the propylene fed, 38.7% was converted to acrolein and 9.4% to carbon dioxide. The yield of acrolein based on propylene consumed was 64.1%.

Example 6

A tin/antimony oxide catalyst (Sn:Sb=4) was prepared as described in Example 1, except that the pellets were oxidised in a stream of air while the temperature was raised from 300°–850° C. at 21.4° per hour, and then maintained at 850° C. for 16 hours. The pellets were impregnated with an alcoholic solution of ethyl silicate (=7.6% molar silica) as described in Example 2, and finally heat-treated at 725° C. for 16 hours. The pellet strength was 7.0 lbs. wt.

The catalyst was placed in a reactor maintained at 460° C. and a gaseous mixture consisting of 10% by volume of propylene, 50% by volume of air and 40% by volume of steam was passed over the catalyst, the contact time being 4 seconds.

Of the propylene fed, 38.4% was converted to acrolein and 6.4% to carbon dioxide.

The yield of acrolein based on propylene consumed was 66.0%.

We claim:

1. A process for producing a catalyst composition for catalyzing the vapor phase oxidation of propylene to acrolein which comprises heating a mixture of oxides of tin and antimony in air at a temperature within the range of from 300° C. to 725° C. for from 8 to 16 hours, again heating at from 550° C. to 1100° C. for from about 10 to 32 hours, adding from 2% to 15% molar ethyl silicate and heating at from 550° C. to 1100° C. for from 10 to 32 hours, the ratio of tin to antimony in the said catalyst being about 4 to 1.

2. A process for producing a catalyst composition for catalyzing the vapor phase oxidation of propylene to acrolein, said composition being prepared by forming pellets of a mixture of the oxides of tin and antimony, heating said pellets in air at a temperature within the range of 300° C. to 725° C. for from 8 to 16 hours, again heating said pellets at from 550° C. to 1100° C. for from 10 to 32 hours, adding from 2% to 15% molar ethyl silicate and heating from 550° C. to 1100° C. for from 10 to 32 hours, the ratio of tin to antimony in the said catalyst being about 4 to 1.

3. A process for producing a catalyst composition for catalyzing the vapor phase oxidation of propylene to acrolein which comprises heating a mixture of the oxides of tin and antimony with from 2% to 15% molar ethyl silicate, forming the thus treated catalyst into pellets, heating said pellets in air at a temperature within the range of 300° C. to 725° C. for from 8 to 16 hours and again heating said pellets at a temperature of 500° C. to 1100° C. for from 10 to 32 hours, the ratio of tin to antimony in the said catalyst being about 4 to 1.

References Cited by the Examiner

UNITED STATES PATENTS

| | | | |
|---|---|---|---|
| 2,154,079 | 4/1939 | Weiss | 252—430 |
| 2,243,404 | 5/1941 | Voorhies | 252—430 |
| 2,738,336 | 3/1956 | Marity | 260—448.8 |
| 3,094,565 | 6/1963 | Bethell et al. | 252—456 |
| 3,152,170 | 10/1964 | Barclay et al. | 252—456 |

TOBIAS E. LEVOW, *Primary Examiner.*

SAMUEL H. BLECH, *Examiner.*